2 Sheets--Sheet 1.

N. F. SANDELIN,
Improvement in Cotton Cultivators.

No. 125,087.        Patented March 26, 1872.

Witnesses.
Fred Haynes
R. W. Rabeau

Nils F. Sandelin

AM. PHOTO-LITHOGRAPHIC CO. N.Y. (OSBORNE'S PROCESS.)

2 Sheets--Sheet 2.
N. F. SANDELIN.
Improvement in Cotton Cultivators.
No. 125,087.        Patented March 26, 1872.
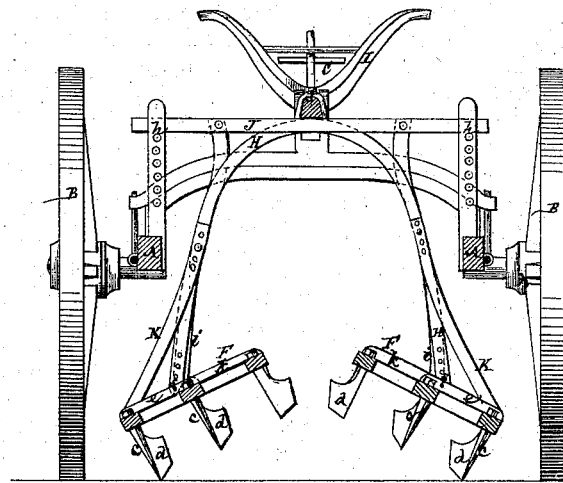

125,087

UNITED STATES PATENT OFFICE.

NILS F. SANDELIN, OF MOTT HAVEN, NEW YORK, ASSIGNOR TO HIMSELF, EDWARD O. JENKINS, OF NEW YORK, N. Y., AND JOHN PAULSON, OF VASA, MINNESOTA.

IMPROVEMENT IN COTTON-CULTIVATORS.

Specification forming part of Letters Patent No. 125,087, dated March 26, 1872.

*To all whom it may concern:*

Be it known that I, NILS F. SANDELIN, of Mott Haven, in the county of Westchester and State of New York, have invented certain new and useful Improvements in Cotton-Cultivators; and I do hereby declare that the following is a full, clear, and exact description of the same, reference being had to the accompanying drawing forming part of this specification, and in which—

Figure 1:
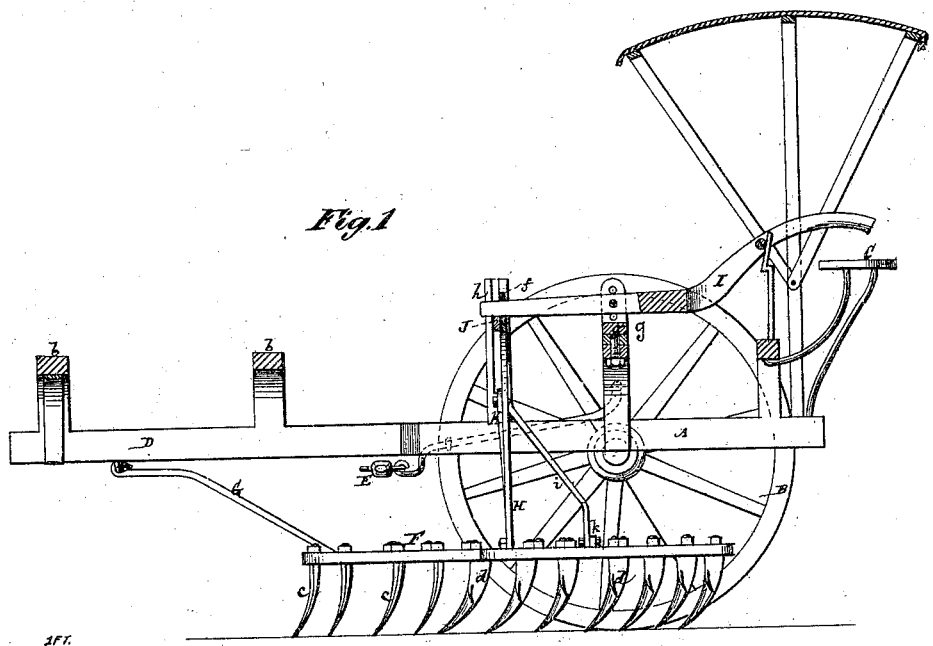
Figure 2:
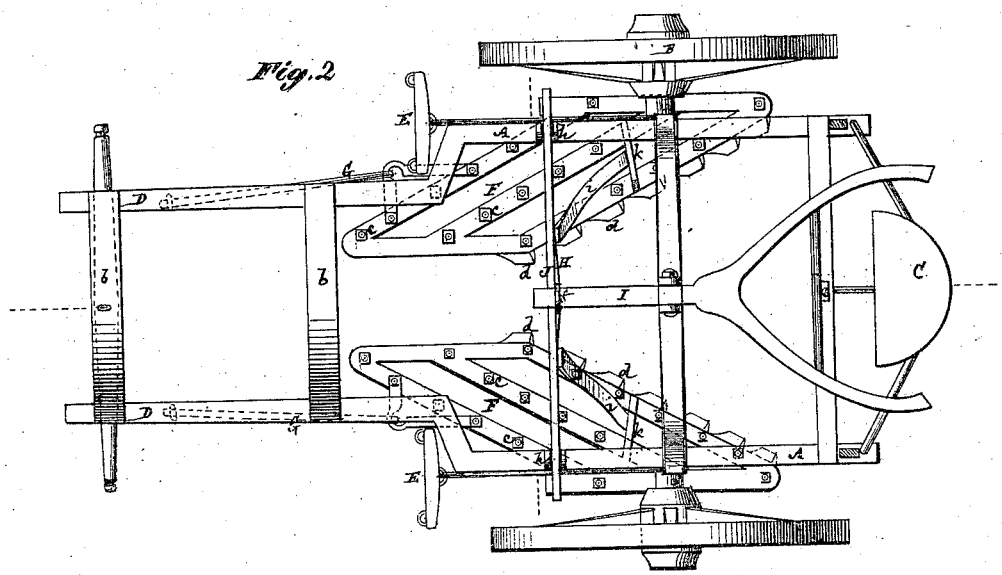

Figure 1 represents a central vertical longitudinal section of a cotton-cultivator constructed in accordance with my invention; Fig. 2, a plan of the same; and Fig. 3, a vertical transverse section at the line $x\,x$ in Fig. 2.

Similar letters of reference indicate corresponding parts throughout the several figures.

My invention relates to a draft-machine or vehicle for cultivating cotton by weeding and breaking up the earth between the rows, and throwing the loosened earth up over or about the roots of the growing plants; and the invention consists in a vehicle for said purpose, constructed to operate on opposite sides simultaneously of each row of growing cotton, by means of two gangs of weeders and plows. These gangs are set angling and adjustable to adapt them to different inclinations in the sides of the row, or as other circumstances may require; and are, furthermore, made capable of being moved about from side to side to adapt them to crooked rows or deviations from a straight path or course in the travel of the vehicle over the ground. The horses or cattle are hitched to the vehicle so that they walk on opposite sides of the row, and the vehicle is constructed of the necessary width to admit of its operation upon each row in succession.

Referring to the accompanying drawing, A represents the frame of the machine, and B B its carrying-wheels, which are arranged at a suitable distance apart to travel between the rows of the growing plant. C is the driver's seat; and D, the draft-pole or frame, which is composed of parallel bars braced by cross-pieces $b\,b$, that are arched to clear the tops of the plant, said bars being disposed at a distance apart, so that a horse hitched to whiffle-trees E E, on either, outside of them, will travel along both sides of the row outside of, and beyond injury to, the plant. F F are the two gangs of weeders $c\,c$, and covering plows or shovels $d\,d$. These gangs are arranged in rear of the draft portion of the machine, on opposite sides of the latter, so as to operate between the rows and on opposite sides of each row in succession, without coming in contact with the plant. They are of a rhomboidal or other suitable shape, with their inner sides parallel to the line of draft or thereabout, and with their advance angles lying innermost or next to the row, and are set inclining latterally from the row, in opposite outward directions. The weeders $c\,c$, of which there may be one, two, or more rows, occupy a position in front of the covering-plows $d\,d$, both of which are arranged in rows running laterally and rearward in relation with the draft, corresponding with the shape and inclinations of the gangs as a whole. Said weeders $c\,c$ may be mere curved tines, and the plows $d\,d$ of an ordinary shovel-kind, shaped to throw the earth loosened by the weeders up over onto the roots of the plants on opposite sides of the row simultaneously. The gangs F F are carried in part by longitudinally arranged rods G G made pendent to the draft-frame D in front, and in part by an arched cross-bar, H, pivoted as at $s\,s$, to foot-strips $e\,e$, which are secured to said gangs in front. Said bar H is provided with a loop, $f$, at its top, so as to straddle the forward end of a lifting lever or handle, I, which is within reach of the driver on his seat, and by which he is enabled to lift the gangs F F and to move them laterally, to effect which latter movement the fulcrum of the lever I is pivoted, as at $g$, to admit of its being swiveled laterally. The raising of the gangs provides for temporarily varying the depth of the weeders' and plows' entry within the earth, and of their clearing the ground when required, while the lateral movement of the gangs allows of the latter being adjusted to crooked rows or to meet any deviation in the travel of the machine from lines or paths parallel with the row; likewise, it provides for throwing up the earth more on one side of the row than the other when required. Said gangs are permanently stopped from falling below a given depth, and are supported, when down, by a cross-bar, J, arranged to rest upon a pair of pins or stops made to fit any of a vertical series of holes in uprights $h$, by which provision is made for adjusting the depth at which the weeders and plows work. This bar I is connected by legs or bars $i\ i$ and foot-strips $k\ k$ with said gangs. Provision is made for varying the angular set of the gangs F F so as to give them more or less inclination laterally, for the purpose of adapting them to work flatter or steeper rows, and otherwise to adapt them to varying conditions of the soil, by means of adjusting-bars K K, attached to the outer ends of the foot-strips $e\ e$, and in adjustable connection above by means of pins or bolts and a series of holes with the cross-arched bar G, the legs or bars $i\ i$, and arched cross-bar H; also being similarly adjustable at their lower ends to the foot-strips $e\ e$ and $k\ k$, with which they are respectively connected.

What is here claimed, and desired to be secured by Letters Patent, is—

The combination of the adjusting bars K K with the gangs F F of weeders and plows, the bar H, the lever I, the legs or bars $i\ i$, and the stop or cross-bar J, substantially as shown and described.

NILS F. SANDELIN.

Witnesses:
 FRED HAYNES,
 R. E. RABEAU.